(12) United States Patent
Kmita et al.

(10) Patent No.: US 6,729,513 B2
(45) Date of Patent: May 4, 2004

(54) VEHICLE ARTICLE CARRIER HAVING TELESCOPICALLY EXTENDABLE ARTICLE CARRIER PORTION

(75) Inventors: Gerard J. Kmita, Allen Park, MI (US); Jeffrey M. Aftanas, Ortonville, MI (US)

(73) Assignee: JAC Products Inc., Saline, MI (US)

( * ) Notice: Subject to any disclaimer, the term of this patent is extended or adjusted under 35 U.S.C. 154(b) by 130 days.

(21) Appl. No.: 10/047,922

(22) Filed: Oct. 29, 2001

(65) Prior Publication Data

US 2003/0080167 A1 May 1, 2003

(51) Int. Cl.⁷ ............................................. B60R 9/045
(52) U.S. Cl. ...................... 224/320; 224/316; 224/321; 224/326
(58) Field of Search ................................ 224/402, 315, 224/316, 320, 326, 310, 321

(56) References Cited

U.S. PATENT DOCUMENTS

| | | |
|---|---|---|
| 2,009,721 A | 7/1935 | Williams |
| 2,833,453 A | 5/1958 | Barecca |
| 2,888,178 A | 5/1959 | Olson |
| 3,058,636 A * | 10/1962 | Bilbeisi ..................... 224/492 |
| 3,193,124 A | 7/1965 | Essling |
| 3,531,006 A | 9/1970 | Farchmin |
| 3,720,358 A | 3/1973 | McIntire |
| 3,726,422 A * | 4/1973 | Zelin ......................... 414/522 |
| 3,777,922 A | 12/1973 | Kirchmeyer |
| 3,921,869 A | 11/1975 | Rogers |
| 3,963,136 A | 6/1976 | Spanke |
| 4,007,862 A | 2/1977 | Heftmann |
| 4,081,095 A * | 3/1978 | Wilburn et al. ............. 414/462 |
| 4,101,061 A | 7/1978 | Sage et al. |
| 4,219,142 A | 8/1980 | Macpherson |
| 4,223,689 A | 9/1980 | Cox |
| 4,240,571 A | 12/1980 | Ernst |
| 4,291,823 A | 9/1981 | Freeman et al. |

(List continued on next page.)

FOREIGN PATENT DOCUMENTS

| | | |
|---|---|---|
| CA | 618404 | 4/1961 |
| DE | 25 51 646 A1 | 6/1977 |
| DE | 33 13 267 A1 | 1/1991 |
| DE | 4112190 A | 10/1992 |
| EP | 152643 | 9/1983 |
| EP | 101054 | 2/1984 |
| EP | 1 104 718 A2 | 6/2001 |
| FR | 2596344 | 9/1983 |

OTHER PUBLICATIONS

Takashi, Luggage Lifting Loading Device on Automobile Roof Topside, Publication Date Sep. 1999, Publication No. 1124535, Abstract Only in English.
Reference 449409 dated Jun. 18, 1949; country and name of inventor unknown.

*Primary Examiner*—Stephen K. Cronin
(74) *Attorney, Agent, or Firm*—Harness, Dickey Pierce P.L.C.

(57) ABSTRACT

A vehicle article carrier specifically adapted for use on a roof of a cab of a pickup truck. The vehicle article carrier includes a slidably extendable article carrier sub-system which allows the overall length of the vehicle article carrier to be effectively increased to better support elongated items such as bicycles, kayaks, canoes and virtually any other item having a length such that would make it awkward to support on an otherwise conventional article carrier assembly having a longitudinal length short enough to be secured to the roof of the pickup truck.

15 Claims, 4 Drawing Sheets

U.S. PATENT DOCUMENTS

| | | |
|---|---|---|
| 4,294,388 A | 10/1981 | Wünstel |
| 4,350,471 A | 9/1982 | Lehmann |
| 4,406,384 A | 9/1983 | Schantz |
| 4,682,719 A | 7/1987 | Ernst et al. |
| 4,705,198 A | 11/1987 | Kamaya |
| 4,757,929 A | 7/1988 | Nelson |
| 4,809,943 A | 3/1989 | Taschero |
| 4,887,750 A | 12/1989 | Dainty |
| 4,995,538 A | 2/1991 | Marengo |
| 5,058,791 A | 10/1991 | Henriquez et al. |
| 5,064,335 A * | 11/1991 | Bergeron et al. ........... 414/522 |
| 5,065,921 A | 11/1991 | Mobley |
| 5,069,595 A * | 12/1991 | Smith et al. ................ 414/462 |
| 5,071,308 A * | 12/1991 | Tibbet ........................ 414/462 |
| 5,115,955 A | 5/1992 | Dallaire et al. |
| 5,192,107 A * | 3/1993 | Smith, Sr. ...................... 293/3 |
| 5,226,570 A | 7/1993 | Pedrini |
| 5,350,145 A | 9/1994 | Fabbri Corsarini |
| 5,397,042 A | 3/1995 | Pedrini |
| 5,417,358 A | 5/1995 | Hasellgrove |
| 5,449,100 A | 9/1995 | Eckhart |
| 5,460,304 A | 10/1995 | Porter et al. |
| 5,535,929 A | 7/1996 | Neill |
| 5,560,525 A | 10/1996 | Grohmann et al. |
| 5,649,655 A | 7/1997 | Kerner |
| 5,673,965 A | 10/1997 | Lenkens |
| 5,690,259 A | 11/1997 | Montani |
| 5,715,980 A | 2/1998 | Blankenburg et al. |
| 5,741,110 A * | 4/1998 | Grinage, Jr. ................ 414/462 |
| 5,884,824 A | 3/1999 | Spring, Jr. |
| 6,015,074 A | 1/2000 | Snavely et al. |
| 6,158,638 A * | 12/2000 | Szigeti ....................... 224/310 |
| 6,308,874 B1 | 10/2001 | Kim et al. |
| 6,338,427 B1 | 1/2002 | Aftanas et al. |
| 6,516,984 B1 * | 2/2003 | Kmita et al. ................ 224/310 |

\* cited by examiner

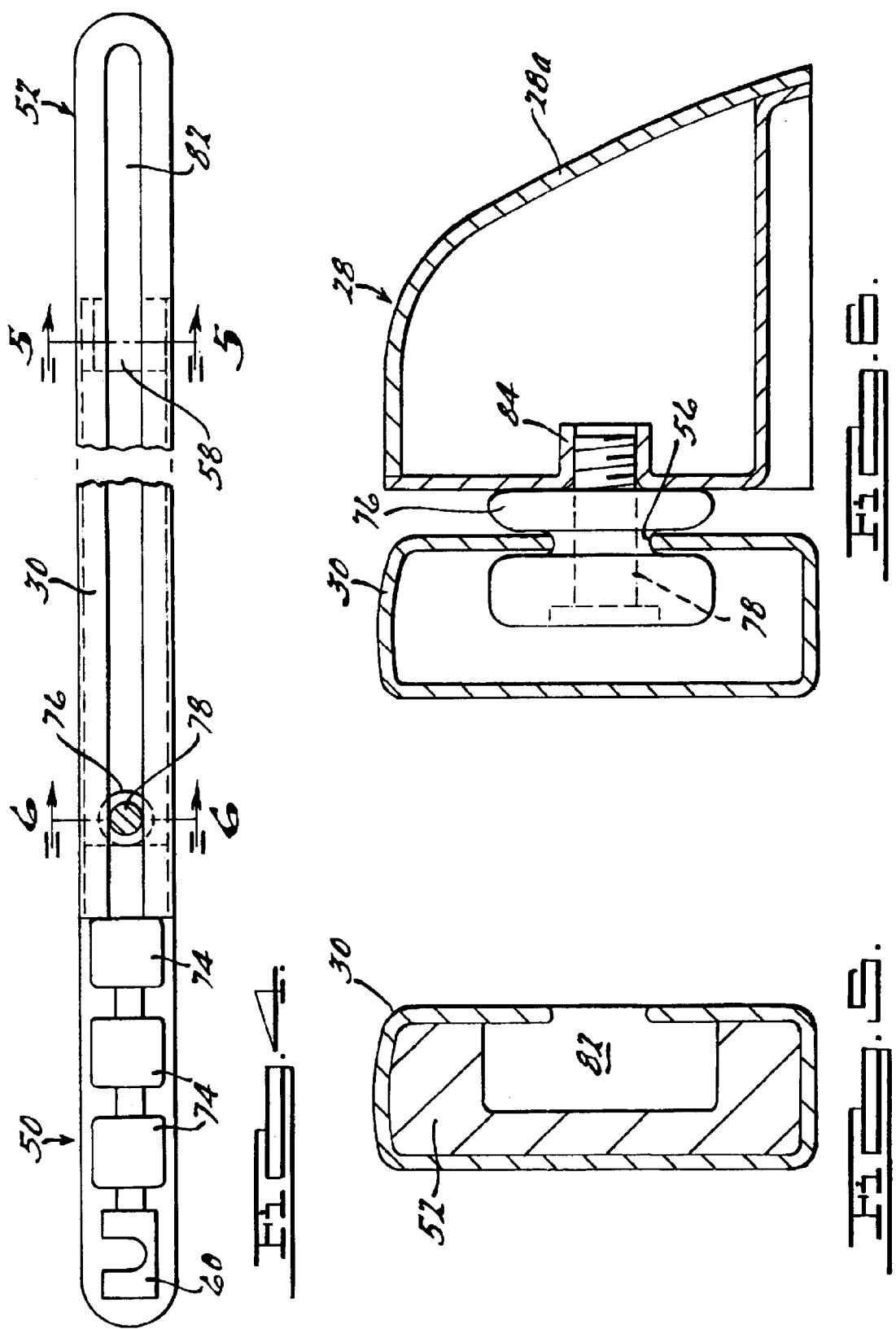

VEHICLE ARTICLE CARRIER HAVING TELESCOPICALLY EXTENDABLE ARTICLE CARRIER PORTION

FIELD OF THE INVENTION

This invention relates to vehicle article carriers, and more particularly to a vehicle article carrier adapted to be used on a cab of a vehicle such as a pickup truck, which includes a slidably extendable article carrying subassembly for carrying elongated items such as canoes, kayaks, lumber, etc.

BACKGROUND OF THE INVENTION

Vehicle article carriers are used on a variety of vehicles to carry objects that are either impossible or cumbersome to carry within the interior area of the vehicle. With vehicles such as pickup trucks, which have a very short roof area over the cab portion of the vehicle, the overall longitudinal length of the vehicle article carrier is quite limited. When attempting to transport elongated items such as canoes, kayaks, and other items which have an overall length longer than the roof of the cab, the relatively short, overall longitudinal length of the vehicle article carrier makes it generally unsuitable for transporting such items. Thus, these items must typically be transported in the bed of the of the pickup truck, thus making the bed unavailable for heavier items which may not be suitable for transporting on the roof of the cab of the vehicle.

Accordingly, it would be highly desirable to provide some form of vehicle article carrier which includes a sub-assembly which can be extended to effectively increase the overall longitudinal length of the vehicle article carrier to better support elongated items.

It would also be desirable if such a vehicle article carrier as described immediately above could be constructed which does not significantly complicate the construction of the vehicle article carrier, does not significantly increase its weight or otherwise complicate the use of the vehicle article carrier when the article carrying sub-assembly is in its retracted position.

SUMMARY OF THE INVENTION

The above and other objects are provided by a vehicle article carrier in accordance with preferred embodiments of the present invention. In one preferred form, the vehicle article carrier comprises a pair of side rails which are secured to a roof of a cab of a vehicle such as a pickup truck extending fore-to-aft on the roof of the cab. Each of the side rails includes a channel for slidably supporting an extendable article carrier sub-assembly. The article carrier sub-assembly can be positioned in a retracted orientation in which it does not extend outwardly of the side rails, and which thus provides the appearance of an otherwise conventional vehicle article carrier assembly. However, when the article carrier sub-assembly is moved into its extended position, the overall effective length of the vehicle article carrier is increased significantly to enable the vehicle article carrier to better accommodate elongated items such as canoes, kayaks, bicycles, and other items having a length which exceeds the length of the roof of the cab of the vehicle. The vehicle article carrier may include an optional, fixed front cross bar to provide still another support point for better supporting elongated articles.

In one preferred embodiment the article carrier sub-assembly includes a pair of parallel disposed longitudinal frame members and a pair of perpendicularly arranged cross bars. The cross bars and the frame members are secured together by a pair of front-end supports a pair of rear-end supports. The front-end supports each include a tap-plate assembly for locking the article carrying sub-assembly in a desired longitudinal position along the side rails. A plurality of guide members are associated with each front-end support for supporting each front-end support slidably on its associated side rail. A pair of fixably disposed support wheels are mounted on each one of the rear-end foot supports of the side rails and form two additional support points for better supporting the article carrying sub-assembly when the sub-assembly is in its fully extended position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is an exploded perspective view of one of the side rails and one half of the article carrier sub-system;

FIG. 4 is a side view of the assembled article carrier sub-system;

FIG. 5 is a cross-sectional end view of the frame rail of the article carrier sub-system of FIG. 4 taken in accordance with section line 5—5 in FIG. 4; and FIG. 6 is a cross-sectional end view of the vehicle article carrier taken in accordance with section line 6—6 in FIG. 5.

DETAILED DESCRIPTION OF THE PREFERRED EMBODIMENTS

Figure 1:
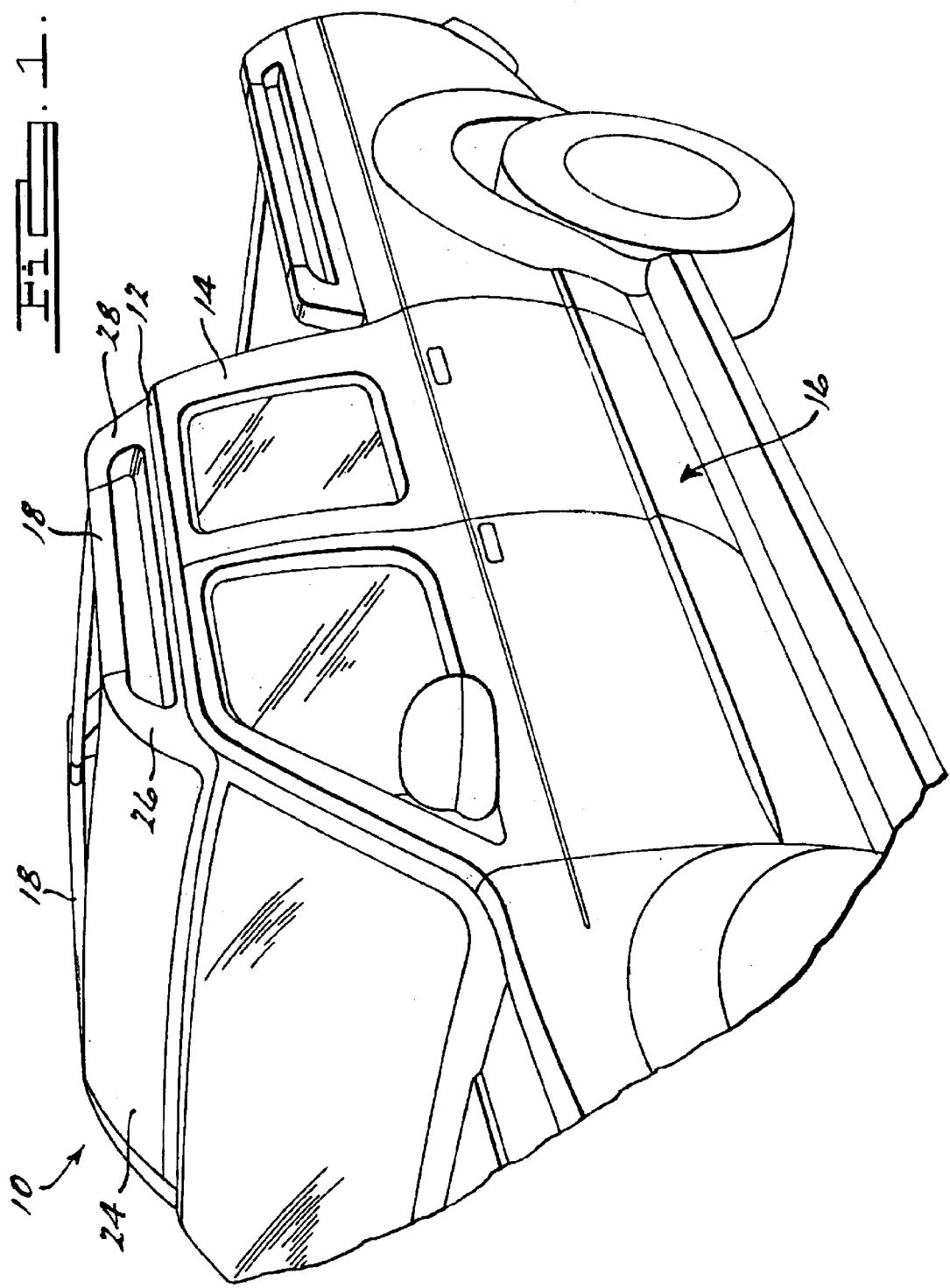
FIG. 1 is a prospective view of a vehicle article carrier in accordance with the present invention disposed on a roof of a cab of a pickup truck.
Figure 2:
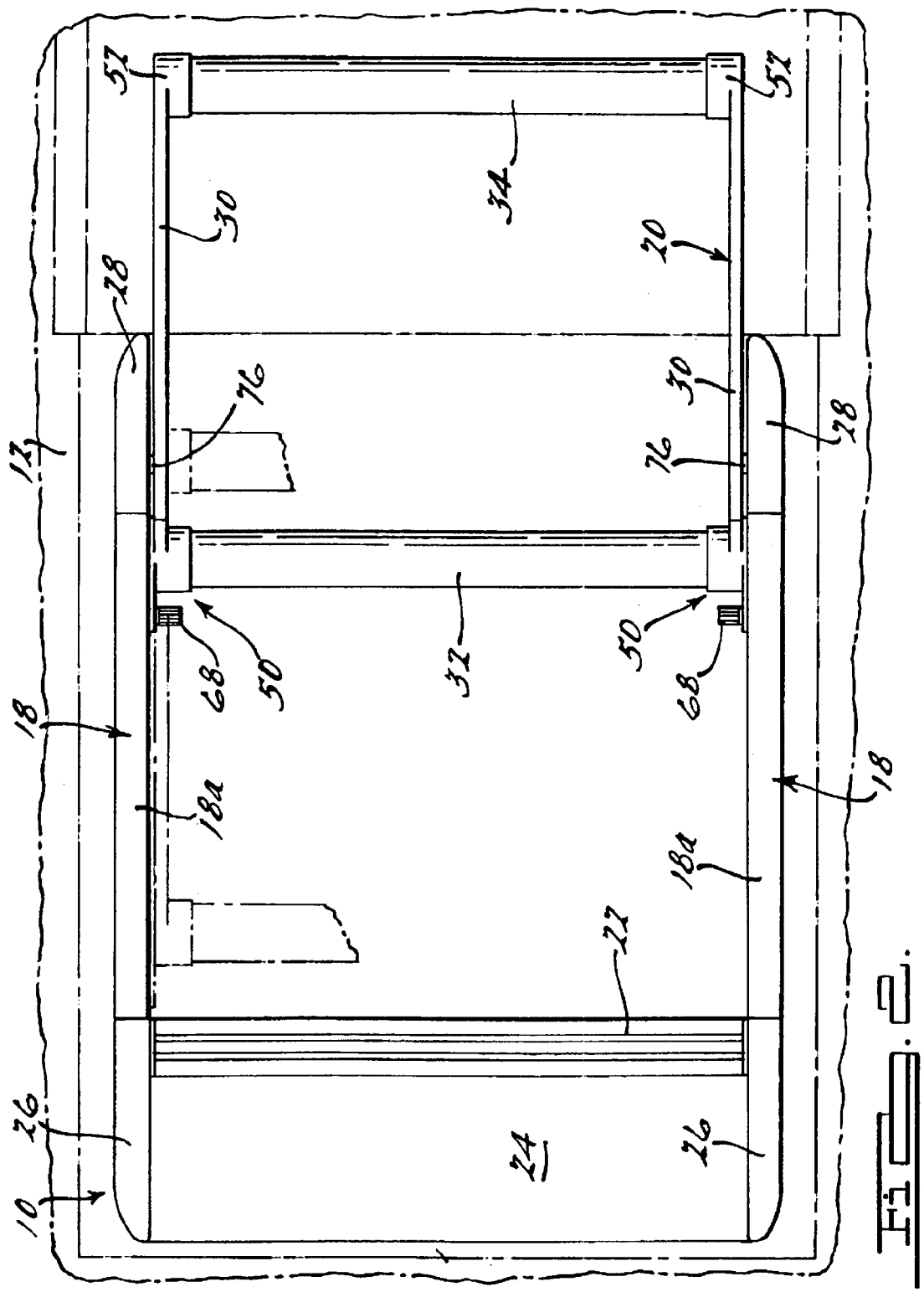
FIG. 2 is a plan view of the vehicle article carrier of FIG. 1 but with an article support sub-assembly thereof in its extended position, and further illustrating a portion of the sub-assembly in phantom.
Figure 7:
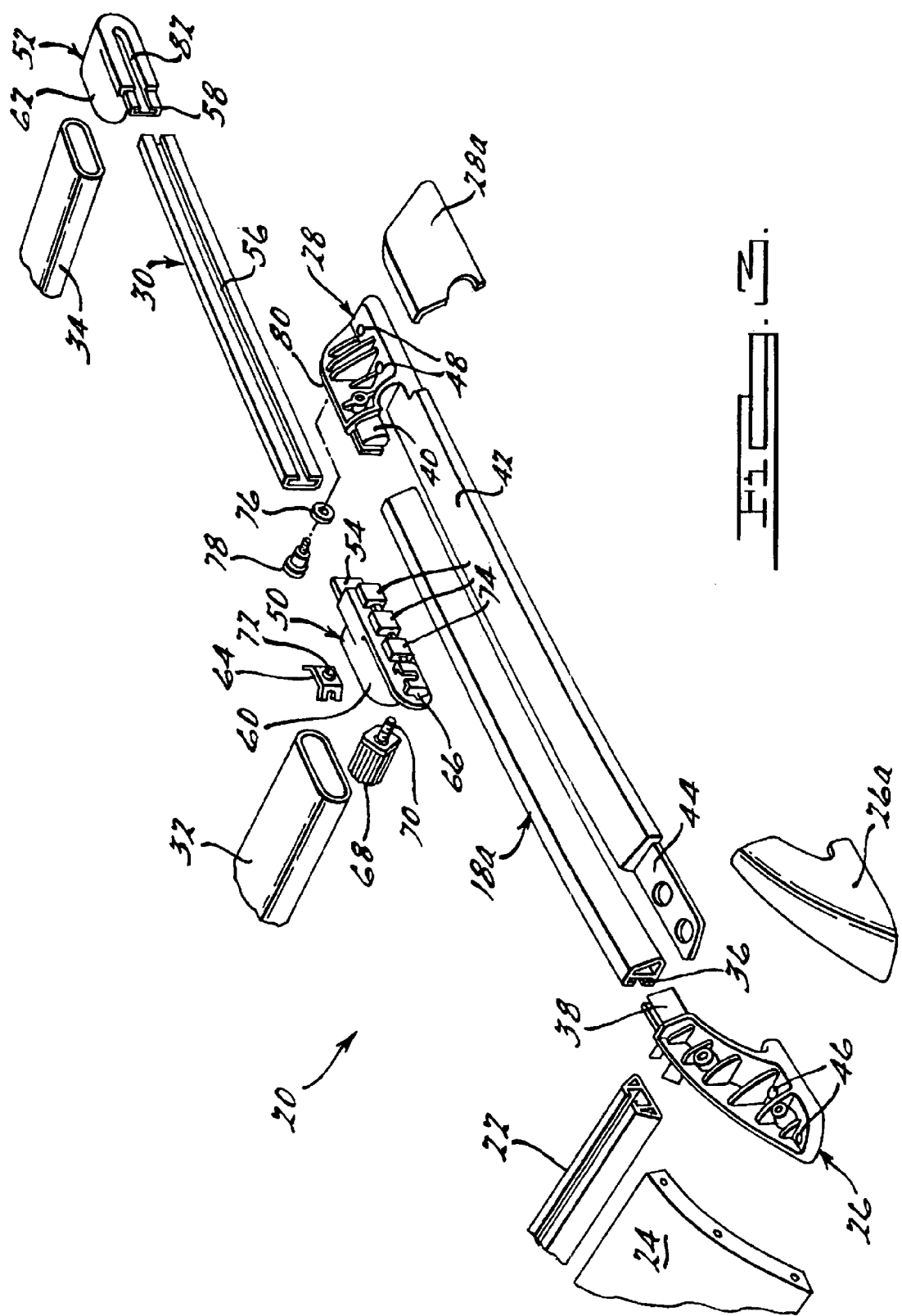

Referring to FIGS. 1 and 2, there is shown a vehicle article carrier 10 in accordance with a preferred embodiment of the present invention. The vehicle article carrier 10 is adapted to be secured to a roof 12 of a cab portion 14 of a motor vehicle 16 such as a pickup truck. It will be appreciated that such vehicles typically have a much shorter roof, longitudinally speaking, than other passenger vehicles. Thus, the overall longitudinal length of a vehicle article carrier used on pickup trucks has been limited because of the shorter roof.

The vehicle article 10 generally includes a pair of side rails 18 disposed generally parallel to another and extending fore-to-aft (i.e., longitudinally) along the vehicle roof 12. The side rails 18 support an article carrier sub-assembly 20 which is adapted to move slidably between a retracted position (FIG. 1) and an extended position shown in FIG. 2. Optionally, a fixed front support 22 could be employed together with an air dam 24 to further improve the aerodynamic performance of the vehicle article carrier 10.

With specific reference to FIG. 2, each side rail 18 can be seen to include a pair of front foot supports 26 and a pair of rear foot supports 28. Each pair of foot supports 26 and 28 supports an associated side rail member 18a therebetween and elevationally above the roof 12 of the vehicle 16. The article carrier sub-assembly 20 can be seen to include a pair of frame rails 30 disposed parallel to one another and a pair of cross bars 32 and 34 which cooperatively form the article carrier sub-assembly 20.

Preferring now to FIG. 3, the construction of the article carrier sub-assembly 20 can be seen in greater detail. The side rail members 18a each include a C-shaped channel 36 and receive a neck portion 38 of front support foot 26 and a neck portion 40 of rear support foot 28. Rear support foot 28 includes an elongated flat portion 42 having a tongue portion 44. The front support 26 rests on tongue portion 44 when the front support foot 26 is assembled to the side rail member 18a. Openings 46 in the front support foot 26 and openings 48 in the rear support foot 28 allow conventional fasteners such as riv nuts to be used to secure each side rail 18 to the roof 12 of the vehicle 16.

With further reference to FIG. 3, each frame rail 20 is coupled to a front end support 50 and a rear-end support 52. A tongue 54 of front end support 50 slides within a C-shaped channel 56 of the frame rail 20, while a tongue portion 58 of the rear end support 52 slides within the channel 56 at opposite end of the frame rail 30. The front end support 50 includes a neck portion 60 which telescopically engages with one end of cross bar 32. Similarly, rear end support 52 includes a neck portion 62 which telescopically engages with an end of rear cross bar 34. The front end support 50 includes a tap plate 64 captured within a pocket 66 formed on the front end support 50. A manually engageable locking knob 68 has a threaded shaft portion 70 which engages a threaded opening 72 in the tap plate 64 to lock the front end support in a desired position along the frame rail 30. Guide posts 74 help to support the front end support 50 on the side rail member 18a for sliding movement there along.

With further reference to FIG. 3, each rear support foot 28 includes a wheel 76 secured via a bolt 78 to an inwardly facing wall portion 80. The wheel 76 is dimensioned to fit within the channel 56 of the frame rail 30 and to assist the article carrier sub-assembly 20 in moving slidably between its extended and retracted positions.

The front support foot 26 includes a cover 26a secured thereto by any conventional means, and the rear support foot 28 similarly includes a cover 28a secured thereto. With further reference to FIGS. 3 and 5, it will be noted that each end support 52 includes a channel 82 which is adapted to receive the wheel 76 when the article carrier sub-assembly 20 is in its fully retracted position. This enables the longitudinal length of travel of the article carrier sub-assembly 20 to be effectively increased without increasing the spacing between the front and rear support feet 26 and 28, respectively. The frame rail 30, front end support 50 and rear end support 52 are shown in assembled relation in FIG. 4. FIG. 6 illustrates the bolt 78 secured through a bore 84 in the wall portion 80 of the rear support foot 28.

In operation, when the user does not require the extended length of the article carrier sub-system 20, then the sub-system can be positioned in its retracted position as shown in FIG. 1. Each of the locking knobs 68 associated with each front end support 50 is tightened such that its associated tap plate 64 locks the front end support to its associated side rail member 18a, thus preventing sliding movement of the sub-assembly along the side rail member 18a.

When carrying elongated items, the user can unthread the locking knobs 68 to allow the article carrier sub-assembly 20 to be urged into its extended position shown in FIG. 2. The lock knob 68 can then be tightened to secure the assembly 20 in this position. It will be appreciated that a variety of mechanisms could easily be employed in place of the knob 68 and tap plate 64 to hold the article carrier sub-assembly 20 stationary, such as spring biased clamping assemblies.

The present invention 10 thus forms a means by which a vehicle article carrier having a relatively short overall length can be effectively lengthened, when needed, to better accommodate elongated items such as bicycles, canoes, kayaks, and virtually any other article which might prove awkward to secure on the article carrier if same had a length corresponding only to the length of a roof of a pickup truck. The present invention 10 further does not significantly add to the cost of an otherwise conventional vehicle article carrier, nor does it increase the overall outward dimensions when the article carrier sub-assembly 20 is in its retracted position. Thus, the vehicle article carrier 10 of present invention still provides an aesthetically pleasing, aerodynamically efficient, light-weight, yet sturdy means for supporting elongated articles above a cab of a pickup truck which might otherwise be difficult to support on longitudinally shorter article carrier assemblies.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle article carrier system adapted to secure elongated items on a roof of a cab of a motor vehicle having a longitudinally shortened roof portion, said system comprising:

a pair of side rails each having an elongated channel and adapted to be disposed fixedly on said roof of said cab generally parallel to one another;

an article carrier subassembly disposed between said side rails and supported by said side rails;

said article carrier subassembly including at least one front end support and at least one rear end support for interfacing with said side rails, and at least one cross bar for supporting an article thereon; and said article carrier subassembly being movable between a retracted position, wherein said subassembly is disposed within said side rails to present a support surface having a first effective length, and an extended position wherein said subassembly protrudes longitudinally from said side rails to present a support surface having a second effective length; and wherein said locking assembly is capable of locking said subassembly at a plurality of positions between said retracted and said extended positions.

2. The vehicle article carrier system of claim 1, wherein said subassembly includes two front end supports and two rear end supports.

3. The vehicle article carrier system of claim 2, wherein said front end supports slidably engage said side rails to support said subassembly.

4. The vehicle article carrier system of claim 2, wherein said rear end supports slidably engage said side rails to support said sub-assembly.

5. The vehicle article carrier system of claim 1 further comprising a locking assembly for securing said article carrier subassembly in its extended and retracted position such that said subassembly is not movable relative to said side rails.

6. The vehicle article carrier system of claim 5, whereby said locking assembly is capable of locking said subassembly at a plurality of positions between said retracted and extended positions.

7. The vehicle article carrier system of claim 6, whereby said locking assembly includes a threaded fastener.

8. The vehicle article carrier system of claim 6, wherein said locking assembly includes a spring loaded pin.

9. A vehicle article carrier system adapted to secure items on a roof of a cab of a motor vehicle having a longitudinally shortened roof portion, said system comprising:

a pair of side rails adapted to be disposed fixedly on said roof of said cab generally parallel to one another;

an article carrier subassembly disposed between said side rails and supported by said side rails;

said article carrier subassembly including a pair of front end supports slidably interfacing with said side rails, at least one cross bar for supporting an article thereon, and a pair of rear end supports;

said article carrier subassembly being movable between a retracted position, and an extended position, wherein said front end supports are in constant engagement with said side rails and said rear end supports are in constant engagement with said subassembly throughout said movement to support said subassembly within said rails; and wherein said article carrier subassembly forms a longitudinal support surface disposed generally parallel to said roof of said cab when positioned in either of said extended and retracted positions.

10. The vehicle article carrier system of claim 9, further comprising a locking assembly for securing said article carrier subassembly in its extended and retracted position such that said subassembly is not moveable relative to its side rails.

11. The vehicle article carrier system of claim 10, whereby said locking assembly is capable of locking said subassembly in a plurality of positions between said retracted and extended positions.

12. The vehicle article carrier system of claim 10, whereby said locking assembly includes a threaded fastener.

13. The vehicle article carrier system of claim 10, whereby said locking assembly includes a spring loaded pin.

14. The vehicle article carrier system of claim 9, wherein said front and rear end supports support said subassembly by applying a force in substantially equivalent directions when said subassembly is in its retracted position, and said front and rear end supports supply a force in substantially opposite directions to said subassembly when said subassembly is in its extended position.

15. A vehicle article carrier system adapted to secure elongated items on a roof of a cab of a motor vehicle having a longitudinally shortened roof portion, said system comprising:

a pair of side rails adapted to be disposed fixedly on said roof of said cab generally parallel to one another;

an article carrier subassembly disposed between said side rails and supported by said side rails;

said article carrier subassembly being movable within said side rails between a retracted position, wherein said subassembly is disposed within said side rails to present a support surface generally parallel to said roof and having a first effective length, and an extended position wherein said subassembly protrudes longitudinally from said side rails but remains generally parallel to said roof;

a locking assembly adapted to secure said article carrier subassembly in its extended position, its retracted position, or in any of a plurality of positions therebetween, such that said subassembly is not movable relative to said side rails;

wherein said locking assembly includes a threaded fastener; and wherein said locking assembly includes a spring loaded pin.

* * * * *